United States Patent Office 3,120,546
Patented Feb. 4, 1964

3,120,546
EPOXY ACYLOXY SILANES
Edwin P. Plueddemann, Midland, Mich., assignor to Dow Corning Corporation, Midland, Mich., a corporation of Michigan
No Drawing. Filed Jan. 30, 1961, Ser. No. 85,505
7 Claims. (Cl. 260—348)

This invention relates to silanes having epoxy groups attached to the silicon through silicon-carbon linkages.

This application is a continuation-in-part of applicant's copending application Serial No. 30,735 filed May 23, 1960 now abandoned, which was in turn a continuation-in-part of and copending with applicant's application Serial No. 695,542, filed November 12, 1957, entitled "A Method of Treating Glass" now Patent 2,946,701.

It is the object of this invention to prepare novel compositions of matter which are useful in the sizing of glass and which are useful for increasing the abrasion resistance of siloxane release coatings on base members. This provides an improved release coating as is described and claimed in the copending application of Lawrence H. Ault and Lynn Salisbury entitled, "Improved Siloxane Coatings," Serial No. 30,734, filed May 23, 1960. Other objects and advantages will be apparent from the following description.

This invention relates to compositions of the formula

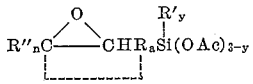

in which R'' is of the group methyl radicals and hydrogen, $n$ has a value from 1 to 2, $n$ being 1 when

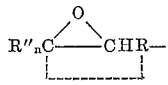

comprises a cycloaliphatic ring, R is of the group divalent hydrocarbon radicals, divalent halohydrocarbon radicals, divalent radicals composed of hydrogen, carbon and oxygen and divalent radicals composed of carbon, hydrogen, halogen and oxygen, in all cases the O being in the form of linkages of the group carboxylic ester and ether linkages, $a$ has a value from 0 to 1, R' is a monovalent hydrocarbon or monovalent halohydrocarbon radical, $y$ has a value of 0 to 2 inclusive and Ac is a carboxy acyl radical of less than 5 carbon atoms.

The compositions of this invention can be prepared by two general methods. One method involves the addition of an epoxy compound containing carbon-carbon unsaturation to an acetoxy silane of the formula

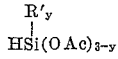

in the presence of a platinum catalyst. For example, one can react allyl glycidyl ether with methyldiacetoxysilane in the presence of chloroplatinic acid at a temperature of 120° C. or below to produce the compound

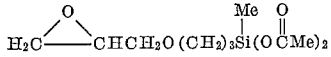

In those cases in which R' is an alkenyl or cycloalkenyl radical the reaction is best carried out by adding the acetoxy silane to a mixture of an excess of the unsaturated epoxide and the platinum catalyst.

A second method of preparing the acetoxy silanes of this invention is that of oxidizing alkenyl or cycloalkenyl-substituted acetoxy silanes with peracids such as peracetic acid. This reaction is best carried out at temperatures of from 30 to 50° C. This method is particularly desirable when $a$ is 0 or when R contains an aromatic ring attached directly to the silicon, for example, styryl silanes. If the acetoxy silane contains more than one unsaturated radical attached thereto, one can oxidize only one of the unsaturated groups by controlling the proportion of peracid employed and/or the reaction time. Thus, for example, one can react 1 mol of divinyldiacetoxysilane with 1 mol or less of peracetic acid at 40 to 50° C. to obtain

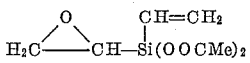

This controlled oxidation offers a second method of preparing the compositions of this invention where R' contains aliphatic or cycloaliphatic unsaturation.

As can be seen from the above formula $a$ can be 0 in which case the epoxy ring is attached directly to the silicon atom. It can also be seen that $n$ can be 1 in which case the epoxy group and R constitute a cycloaliphatic ring which may be attached directly to the silicon as in the case of

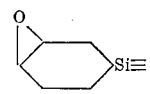

groups or the ring can be attached to the silicon through a bridge such as the

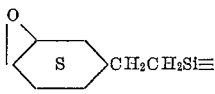

group. It can also be seen that $y$ can range from 0 to 2. Thus, this invention includes monoacyloxy, diacyloxy and triacyloxy epoxy silanes.

For the purpose of this invention R can be any divalent aliphatic hydrocarbon radical such as methylene, ethylene, propylene, hexylene or octadecylene; any monocyclic hydrocarbon radical such as any cycloalkylene radicals such as cyclohexylene, methylcyclohexylene and cyclopentylene; any unsaturated aliphatic divalent hydrocarbon radical such as —CH$_2$CH=CH— and any monocyclic aromatic divalent hydrocarbon radical such as phenylene, tolylene or

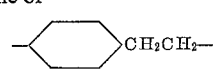

any bicyclic divalent aromatic hydrocarbon radical such as xenylene. R can also be any aliphatic divalent halohydrocarbon radical such as chloroethylene or fluoroethylene, any monocyclic divalent aromatic halohydrocarbon radical such as bromophenylene and any bicyclic divalent aromatic halohydrocarbon radical such as bromoxenylene; any divalent ether radical of the type (ROR)$_x$ where $x$ is an integer of at least 1 such as aliphatic radicals such as

—CH$_2$CH$_2$OCH$_2$CH$_2$—

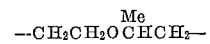

—CH$_2$(OC$_2$H$_4$)$_6$O(CH$_2$)$_3$—

—CH$_2$OC$_2$H$_4$OC$_2$H$_4$—

—CH$_2$OCH$_2$CH=CH—

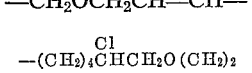

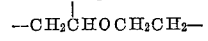

and —CH$_2$OC$_2$F$_4$OCH$_2$CH$_2$CH$_2$—; and R can be any carboxylic ester linkage such as monocyclic radicals such as

and

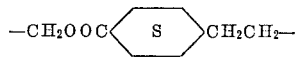

and aliphatic radicals such as $-CH_2(OCH_2CH_2)_4OOC(CH_2)_6-$ $-CH_2OOCCH=CH_2-$ and

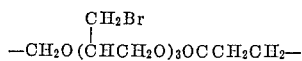

R' can be any aliphatic monovalent hydrocarbon radical such as alkyl radicals such as methyl, ethyl, butyl, isopropyl, or octadecyl and any alkenyl radical such as vinyl, hexenyl or decenyl; or any monocyclic hydrocarbon radicals such as cycloaliphatic hydrocarbon radical such as cyclopentyl, cyclohexyl, cyclohexenyl or methylcyclohexyl; any aromatic hydrocarbon radical such as phenyl and tolyl, and any aralkyl hydrocarbon radical such as benzyl or beta-phenylethyl, any bicyclic aromatic hydrocarbon radical such as xenyl and naphthyl. R' can also be any halogenated hydrocarbon radical such as chloromethyl, chloropropyl, bromophenyl, α,α,α-trifluorotolyl, trifluoropropyl, bromocyclohexyl, para-bromobenzyl and iodophenyl.

Ac can be any carboxy acyl radical of from 1 to 4 carbon atoms such as formyl, acetyl, propionyl, butyryl or acrylyl. Thus, Ac has the formula

in which R''' is hydrogen or an aliphatic hydrocarbon radical of 1 to 3 inclusive carbon atoms.

The acyloxy silanes of this invention are particularly useful in increasing the adhesion of siloxane release coatings to base members. This is of particular advantage in connection with release coatings on paper and other fibrous backings. In this regard the acyloxy silanes are unique with respect to the corresponding alkoxy silanes.

The following examples are illustrative only and should not be construed as limiting the invention which is properly delineated in the appended claims.

In the specification and claims the following abbreviations are used: Me for methyl, Et for ethyl, Bu for butyl and Ph for phenyl.

*Example 1*

.25 mol of triacetoxy silane, .25 g. of a butanol solution of chloroplatinic acid, said solution containing .2% by weight platinum, and .25 mol of allyl glycidyl ether were mixed and stirred for 1 hour at 120° C. An additional .125 mol of allyl glycidyl ether was added and the mixture was warmed for 1.5 hours and filtered. The product was strip distilled to remove the excess allyl glycidyl ether and the residue was the compound

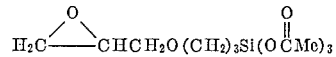

This material had a refractive index at 25° C. of 1.4405 and a specific gravity at 25° C. of 1.203.

*Example 2*

.75 mol of allyl glycidyl ether was mixed with .2 g. of platinum dispersed on charcoal in amount of 1% by weight platinum. The mixture was warmed to 120° C. and .5 mol of methyldiacetoxy silane was added thereto with stirring at such a rate that the temperature did not exceed 120° C. After the addition was complete, the mixture was warmed at 110° C. for an additional hour. The excess ether was removed and the product was distilled to give the composition

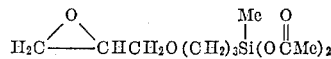

This material boiled at 104° C. at 1 mm. and had the following properties at 25° C.: refractive index=1.4405 and density=1.114.

*Example 3*

Using the procedure of Example 1, 1.5 mols of allyl glycidyl ether was reacted with 1 mol of dimethyl monoacetoxy silane. The product was distilled to give

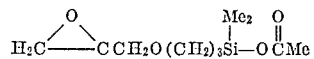

boiling 115 to 116° C. at .5 mm.

*Example 4*

When 1 mol of the following epoxides is reacted with .5 mol of the following acyloxy silanes using the catalysts and temperature conditions of Example 1, the following products are obtained.

| Epoxide | Acyloxy Silane | Product |
|---|---|---|
| $\overset{O}{\overset{\diagup\diagdown}{CH_2CHCH=CH_2}}$ | $HSi(OCEt)_3$ | $H_2C\overset{O}{\overset{\diagup\diagdown}{-}}CHCH_2CH_2Si(OCEt)_3$ |
| $\overset{O}{\overset{\diagup\diagdown}{CH_2CHCH_2OCH_2CMCH}}$ | $\overset{Ph}{HSi(OCMe)_2}$ | $H_2C\overset{O}{\overset{\diagup\diagdown}{-}}CHCH_2OCH_2CH=CH\overset{Ph}{Si(OCMe)_2}$ |
| (thiophene)CH=CH$_2$ | $\overset{C_6H_5Cl}{HSiOOCH}$ Et | (epoxy-thiophene)CH$_2$CH$_2$SiOOCH with $C_6H_5Cl$, Et |
| $\overset{O}{\overset{\diagup\diagdown}{CH_2CHCCl=CH_2}}$ | $HSi(OCMe)_2$ | $H_2C\overset{O}{\overset{\diagup\diagdown}{-}}CHCHClCH_2Si(OCMe)_2$ |
| $\overset{O}{\overset{\diagup\diagdown}{CH_2CHCH_2O(C_2H_4O)_3CH_2CH=CH_2}}$ | $HSi(OCMe)_3$ | $H_2C\overset{O}{\overset{\diagup\diagdown}{-}}CHCH_2O(CH_2CH_2O)_3(CH_2)_3Si(OCMe)_3$ |
| $\overset{O}{\overset{\diagup\diagdown}{CH_2CHOCHCH_2OCH=CH_2}}$ with $CH_2Br$ | $\overset{CH_2CH_2CF_3}{HSi(OOCMe)_2}$ | $H_2C\overset{O}{\overset{\diagup\diagdown}{-}}CHOCHCH_2OCH_2CH_2Si(OOCMe)_2$ with $CH_2Br$, $CH_2CH_2CF_3$ |
| (epoxy-thiophene) | $\overset{C_{18}H_{37}}{HSi(OOCMe)_2}$ | (epoxy-thiophene)—Si(OOCMe)$_2$ with $C_{18}H_{37}$ |

| Epoxide | Acyloxy Silane | Product |
|---|---|---|
| 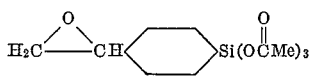 $\overset{O}{\overset{\diagup\diagdown}{CH_2CHCBr=CH_2}}$ | $HSi(O\overset{O}{\overset{\|}{C}}Pr)_3$ | $H_2C\overset{O}{\overset{\diagup\diagdown}{\text{———}}}CHCHBrCH_2Si(O\overset{O}{\overset{\|}{C}}Pr)_3$ |
| 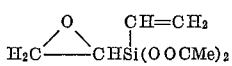 $\overset{O}{\overset{\diagup\diagdown}{CH_2CHCH_2OOCC}}\overset{Me}{\underset{\|}{=}}CH_2$ | $\overset{CH_2Cl}{\underset{\|}{HSi(OOCMe)_2}}$ | $H_2C\overset{O}{\overset{\diagup\diagdown}{\text{———}}}CHCH_2OOC\overset{Me}{\underset{\|}{C}}H\overset{CH_2Cl}{\underset{\|}{CH_2\overset{}{S}i(OOCMe)_2}}$ |
| 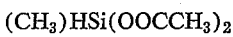 $\overset{O}{\overset{\diagup\diagdown}{CH_2CHCH_2OOCCF}}=CF_2$ | $\overset{Me}{\underset{\|}{HSi(OOCMe)_2}}$ | $H_2C\overset{O}{\overset{\diagup\diagdown}{\text{———}}}CHCH_2OOCCFHCF_2\overset{Me}{\underset{\|}{S}i(OOCMe)_2}$ |
| 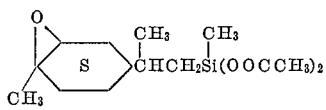 | $HSi(OOCMe)_3$ | |
| 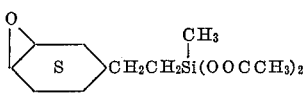 $MeCH\overset{O}{\overset{\diagup\diagdown}{\text{———}}}CHCOOCH_2CH=CH_2$ | $HSi(OOCMe)_3$ | $MeCH\overset{O}{\overset{\diagup\diagdown}{\text{———}}}CHCOOCH_2CH_2CH_2Si(OOCMe)_3$ |
| 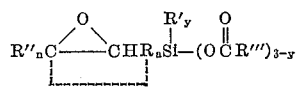 $Me_2C\overset{O}{\overset{\diagup\diagdown}{\text{———}}}CHCH_2OCH_2CH=CH_2$ | $HSi(OOCMe)_3$ | $Me_2C\overset{O}{\overset{\diagup\diagdown}{\text{———}}}CHCH_2OCH_2CH_2CH_2Si(OOCMe)_3$ |

Example 5

When 1 mol of styryl triacetoxy silane is mixed with 1 mol of peracetic acid and the mixture warmed to 40 to 50° C., the product $$H_2C\overset{O}{\overset{\diagup\diagdown}{\text{———}}}CH\diagup\!\!\diagdown Si(O\overset{O}{\overset{\|}{C}}Me)_3$$

is obtained.

Example 6

When 1 mol of divinyldiacetoxy silane is mixed with 1 mol of peracetic acid and the mixture warmed at 40 to 50° C., the product $$H_2C\overset{O}{\overset{\diagup\diagdown}{\text{———}}}CH\overset{CH=CH_2}{\underset{\|}{S}i(OOCMe)_2}$$

is obtained.

Example 7

46.5 g. of limonene monoxide was mixed with 4 drops of a solution of chloroplatinic acid in dimethylphthalate, which solution contained 1% by weight Pt, and the mixture was heated to 130° C. Then 40.5 g. of $$(CH_3)HSi(OOCCH_3)_2$$

was added over a 20 minute period. The mixture was then heated 2 hours at 130° to 140° C. The resulting product was

Example 8

993 g. of vinylcyclohexene monoxide was mixed with 3 cc. of the chloroplatinic acid solution of Example 7. The mixture was warmed to 130° C. and 1296 g. of methyldiacetoxysilane was added with stirring. The mixture was then stirred for 2 hours at 130 to 140° C. The product was

having $n_D^{25}$ of 1.4588 and sp. gr.$^{25}$ of 1.110.

That which is claimed is:

1. A compound of the formula

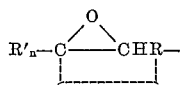

in which

R'' is selected from the group consisting of methyl radicals and hydrogen atoms, $n$ has a value from 1 to 2 inclusive, R is selected from the group consisting of
  (1) divalent and trivalent hydrocarbon radicals of no more than 18 carbon atoms selected from the group consisting of aliphatic hydrocarbon radicals, monocyclic hydrocarbon radicals and bicyclic aromatic hydrocarbon radicals;
  (2) divalent and trivalent halohydrocarbon radicals of no more than 18 carbon atoms selected from the group consisting of aliphatic halohydrocarbon radicals, monocyclic halohydrocarbon radicals and bicyclic aromatic halohydrocarbon radicals;
  (3) divalent and trivalent radicals composed of hydrogen, carbon and oxygen atoms, selected from the group consisting of aliphatic and monocyclic radicals; and
  (4) divalent and trivalent radicals composed of hydrogen, carbon, halogen and oxygen atoms, selected from the group consisting of aliphatic and monocyclic radicals, in all cases in (3) and (4) the oxygen atoms being in the form of linkages selected from the group consisting of $$-\overset{O}{\overset{\|}{C}}-O-C-$$

and —C—O—C— linkages, there being no more than one $$-\overset{O}{\overset{\|}{C}}-O-C-$$

group per molecule, (3) and (4) each containing no more than 20 carbon atoms,

R being free of acetylenic linkages and R being trivalent and $n$ being 1 when the group $$R'_n-C\overset{O}{\overset{\diagup\diagdown}{\text{———}}}CHR-$$

comprises a cycloaliphatic ring, $a$ has a value from 0 to 1 inclusive,

R' is free of acetylenic linkages, contains no more than 18 carbon atoms and is selected from the group consisting of monovalent hydrocarbon radicals and monovalent halohydrocarbon radicals, which are selected from the group consisting of aliphatic, monocyclic and bicyclic aromatic radicals, $y$ has a value from 0 to 2 inclusive and R''' is selected from the group consisting of hydrogen atom and aliphatic hydrocarbon radicals of from 1 to 3 inclusive carbon atoms.

2. A compound in accordance with claim 1 wherein R'' is hydrogen, R is a trivalent aliphatic hydrocarbon radical of no more than 18 carbon atoms, R' and R'''
are both methyl.

3. A compound in accordance with claim 1 wherein R'' is hydrogen, R is a divalent radical of no more than 20 carbon atoms composed of hydrogen, carbon and oxygen in the form of a —C—O—C linkage and R' and R'' are both methyl.

4. A compound of the formula

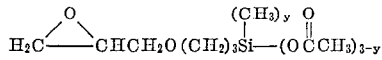

in which y has a value from 0 to 2 inclusive.

5. A compound of the formula

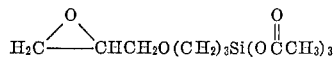

6. A compound of the formula

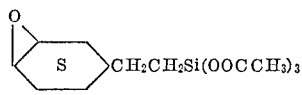

7. A compound of the formula

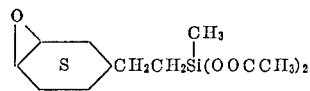

References Cited in the file of this patent

UNITED STATES PATENTS

| | | |
|---|---|---|
| 2,608,495 | Barry | Aug. 26, 1952 |
| 2,728,781 | Shokal et al. | Dec. 27, 1955 |
| 2,730,532 | Martin | Jan. 10, 1956 |
| 2,819,245 | Shorr | Jan. 7, 1958 |
| 2,946,701 | Plueddemann | July 26, 1960 |
| 2,970,150 | Bailey | Jan. 31, 1961 |

UNITED STATES PATENT OFFICE
CERTIFICATE OF CORRECTION

Patent No. 3,120,546            February 4, 1964

Edwin P. Plueddemann

It is hereby certified that error appears in the above numbered patent requiring correction and that the said Letters Patent should read as corrected below.

Columns 3 and 4, in the table, under the heading "Epoxide", the second formula should appear as shown below instead of as in the patent:

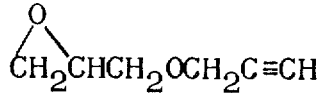

Signed and sealed this 8th day of December 1964.

(SEAL)
Attest:

ERNEST W. SWIDER
Attesting Officer

EDWARD J. BRENNER
Commissioner of Patents